(12) United States Patent
Bowen et al.

(10) Patent No.: US 7,511,258 B2
(45) Date of Patent: Mar. 31, 2009

(54) OPTICAL BENCH HAVING V-GROOVE FOR ALIGNING OPTICAL COMPONENTS

(75) Inventors: Terry P. Bowen, Etters, PA (US); Richard J. Perko, Harrisburg, PA (US); John B. Breedis, Boston, MA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 10/520,075

(22) PCT Filed: Jul. 3, 2003

(86) PCT No.: PCT/US03/21138

§ 371 (c)(1), (2), (4) Date: Sep. 28, 2005

(87) PCT Pub. No.: WO2004/005970

PCT Pub. Date: Jan. 15, 2004

(65) Prior Publication Data

US 2006/0097137 A1 May 11, 2006

Related U.S. Application Data

(60) Provisional application No. 60/393,486, filed on Jul. 3, 2002.

(51) Int. Cl.
*H01J 3/14* (2006.01)
*G02B 6/26* (2006.01)
(52) U.S. Cl. ......................... 250/216; 385/52
(58) Field of Classification Search ................ 250/216; 385/52–56; 438/31
See application file for complete search history.

(56) References Cited

U.S. PATENT DOCUMENTS 4,768,199 A 8/1988 Heinen et al. .................. 372/36
5,849,204 A * 12/1998 Matsumoto .................. 216/11

(Continued)

FOREIGN PATENT DOCUMENTS

EP 1 143 273 A2 10/2001

(Continued)

OTHER PUBLICATIONS

Patent Abstracts of Japan 11-295551 (NHK Spring Co Ltd), Oct. 29, 1999.

(Continued)

*Primary Examiner*—Thanh X Luu (57) ABSTRACT

An optical package having a top and bottom orientation and comprising: (a) a platform defining a V-groove with walls of a certain pitch; (b) a first optical component having a reference surface and two sides, each side being beveled at the certain pitch outwardly from the reference surface, the first optical component having a first optical axis, the first optical component being disposed in the V-groove such that the reference surface faces downward and the sides are in parallel contact with the walls of the V-groove; and (c) a second optical component having an outer periphery with at least two contact points and a second optical axis, the second optical component being disposed in the V-groove such that the contact points contact the walls of the V-groove and the second optical axis is coaxial with the first optical axis.

7 Claims, 5 Drawing Sheets

U.S. PATENT DOCUMENTS

| | | | |
|---|---|---|---|
| 5,909,524 A | 6/1999 | Tabuchi | 385/49 |
| 6,786,649 B2 * | 9/2004 | Sherrer | 385/84 |
| 6,931,215 B1 * | 8/2005 | Fukuda et al. | 398/201 |
| 6,934,449 B2 * | 8/2005 | Uekawa et al. | 385/52 |

FOREIGN PATENT DOCUMENTS

| | | |
|---|---|---|
| JP | 11-295551 | 10/1999 |
| JP | 2001-215370 | 8/2001 |

OTHER PUBLICATIONS

Patent Abstracts of Japan 2001-215370 (Kyocera Corp), Aug. 10, 2001.

* cited by examiner

OPTICAL BENCH HAVING V-GROOVE FOR ALIGNING OPTICAL COMPONENTS

REFERENCE TO RELATED APPLICATION

This application claims priority to U.S. Provisional Application No. 60/393,486 filed on Jul. 3, 2002 and hereby incorporated by reference.

FIELD OF INVENTION

This invention relates generally to an optical assembly, and, more specifically, to an optical assembly having an alignment member for optically aligning its components.

BACKGROUND

The use of optical fibers as a medium for transmission of digital data (including voice data) is becoming increasingly more common due to the high reliability and large bandwidth available with optical transmission systems. Fundamental to these systems are optical assemblies for transmitting/receiving optical signals and multiplexing/demultiplexing signals. The manufacture of these optical assemblies, however, tends to be difficult, expensive, and time consuming.

One of the primary technical challenges associated with the manufacture of optical assemblies, especially systems offering higher levels of integration, is component optical alignment. This is especially applicable in free-space, interconnect optical systems where discrete optical components, such as active devices (e.g., semiconductor lasers), passive devices (e.g., filters), and/or MOEMS (micro-optical electromechanical systems) (e.g., tunable filters and switches) are integrated on a common mounting system to exacting tolerances, typically in the sub-ten micrometer down to sub-micrometer range. These optical mounting systems, sometimes referred to as "optical benches," provide a rail or platform to facilitate the mounting of various optical elements in fixed relationship to achieve optical alignment.

For components to be optically aligned, they must be held in a precise spacial relationship with respect to each other along the x, y, and z axes. (The z-axis is, by convention, the optical axis.) There are generally two alignment approaches for aligning optical components on a platform —active and passive. In passive alignment, registration or alignment features are typically fabricated directly on the components as well as on the platform to which the components are to be mounted. The components are then positioned on the platform using the alignment features and affixed in place. In active alignment, the optical components are placed on the platform, but before being affixed thereto, an optical signal is transmitted through the components while they are manipulated to provide optimum optical performance. Once optimum performance is achieved, the components are affixed to the platform. Although active alignment tends to be more precise than passive alignment, passive alignment facilitates high-speed, high-volume automated manufacturing and, thus, is preferred. It tends to be exceedingly difficult, however, to optically align in all three axes using passive alignment, especially if exceptionally good alignment is required. Nevertheless, a significant reduction in manufacturing time and costs can be realized if passive alignment can be used to achieve acceptable alignment along two axes or even one so that active alignment is only necessary for the remaining axes or for fine tuning.

Therefore, a need exists for an optical mounting platform which eliminates or reduces the need for active alignment but which is precise down to the submicron range. The present invention fulfills this need among others.

SUMMARY OF INVENTION

The present invention provides for a true position bench (herein "TPB") that is capable of not only aligning optical components within submicron tolerances, but also lends itself to passive alignment. Specifically, the TPB of the present invention employs a platform having a V-groove which ensures passive alignment along the x and y axes among the optical components mounted within the V-groove. Although V-grooves are well known in the art for aligning fiber, the present invention uses the V-groove to align substrate-type optical components (i.e., non-circular cross section) such as laser assemblies. To this end, the present invention provides for side features on the substrate-type optical component to allow it to mount reliably within the V-groove such that its optical axis is coaxial with those of the other optical components mounted in the V-groove.

One aspect of the invention is an optical assembly comprising a platform with a V-groove in which the optical components (including substrate-type optical components) are mounted. In a preferred embodiment, the optical assembly has a top and bottom orientation and comprises: (a) a platform defining a V-groove with walls of a certain pitch; (b) a first optical component having a reference surface and two sides, each side being beveled at the certain pitch outwardly from the reference surface, the first optical component having a first optical axis, the first optical component being disposed in the V-groove such that the reference surface faces downward and the sides are in parallel contact with the walls of the V-groove; and (c) a second optical component having an outer periphery with at least two contact points and a second optical axis, the second optical component being disposed in the V-groove such that the contact points contact the walls of the V-groove and the second optical axis is coaxial with the first optical axis.

Another aspect of the invention is a method of manufacturing the first optical component for use in the optical assembly described above. In a preferred embodiment, the method comprises: (a) defining the location of at least two parallel V-grooves in a wafer to define at least one center portion between two V-grooves and a side portion on either side of the center portion; (b) defining a fiducial location for mounting an optical element on the center portion between the parallel V-grooves, the fiducial locating being a certain distance relative to the parallel V-grooves; (c) etching the V-grooves; (d) creating a fiducial in the fiducial location; (e) positioning an optical element on the center portion based on the location of the fiducial and securing said optical element of said center portion; and (f) separating the side portions from the center portion. Preferably, the wafer is used to produce a number of substrates. According, in a preferred embodiment, there are more than two parallel V-grooves formed in the wafer and the side portions mentioned above are also formed into substrates. In yet another preferred embodiment, the first optical component is an opto-electric component. In such an embodiment, it is preferable that solder pads (for receiving an opto-electric device) are defined on the substrate during the same photolithography step(s) in which the parallel V-grooves are defined.

The TPB of the present invention and its manufacture have a number of important advantages over the prior art. First, since the V-groove has register surfaces along the x and y-axes, it provides for xy alignment. This is a significant advantage over prior art optical benches, such as platforms and rails, which tend to provide alignment along either the x or y axis, but not both. Furthermore, xy passive alignment is particularly valuable since it tends to be difficult to achieve than z alignment.

Not only does the TPB of the present invention provide for xy alignment, but the mechanism it uses to effect alignment is particularly robust. That is, since the optical components are mounted to a common surface, the TPB is more tolerant of environment changes and manufacturing tolerances. For example, if the TPB is exposed to significant temperature swings, the effect of dimensional variations of the TPB will be mitigated since all of the optical components are mounted on the same surface. In other words, any changes will affect all the components equally. Additionally, if the V-groove is subject to manufacturing variations, the inter-component effects will again be minimized since all the components will be affected similarly. For example, if the V-groove is etched more narrowly, the optical components will all seat higher relative to the bottom of the V-groove.

Yet another advantage of the TPB of the present invention is the precision it affords. Specifically, techniques have been developed for forming V-grooves in substrates to exacting tolerances. This is significant not only with respect to the main V-groove, but also with respect to the first optical component. Specifically, the substrate of the first optical component is preferably formed by etching parallel V-grooves into a wafer and then parting the wafer along the V-grooves to form the substrate. Thus, the dimensions of the substrate are defined using V-grooves which, as mentioned above, are extremely accurate.

The present invention also allows for extremely accurate positioning of an opto-electric device on the substrate of the first optical component. Specifically, the V-grooves and the solder pads for the opto-electric device can be located on the wafer in one step using well-known photolithography techniques. The ability to do both at the same time is important since the distance from the optical axis of the opto-electric device and the sides of the substrate is critical. Defining the solder pads in effect defines the position of the opto-electric device on the substrate since the surface tension of the solder pads will tend to pull the device over them during reflow. This is a well-known technique. Thus, the preparation technique of the present invention not only defines the dimensions of the substrate accurately using V-groove techniques, but also defines the position of the solder pads (and thus the optoelectric device) precisely with respect to the sides of the substrate. (Although the present invention realizes certain advantages over prior art techniques in manufacturing an opto-electric first optical component, it should be understood that the invention is not limited to an opto-electric first optical component.)

DETAILED DESCRIPTION

Figure 1:
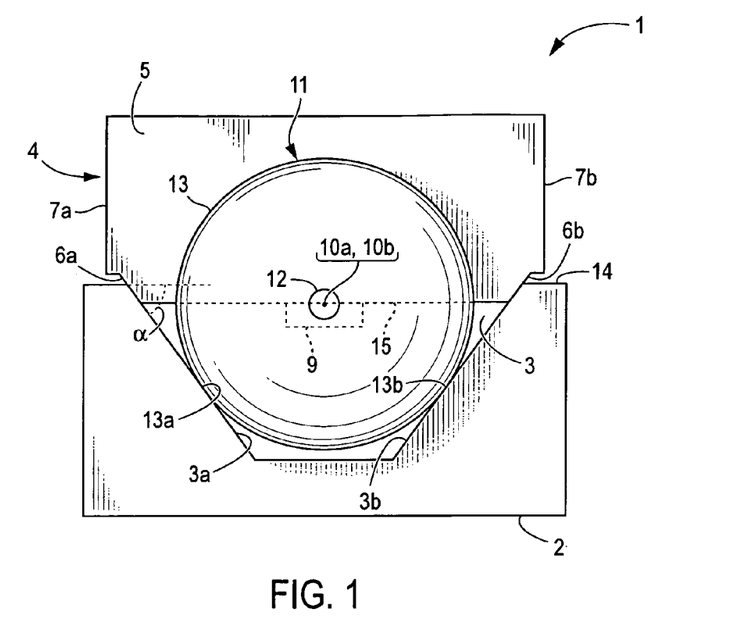
FIG. 1 is a side view of a preferred embodiment of the optical assembly using the true position bench of the present invention.
Figure 2:
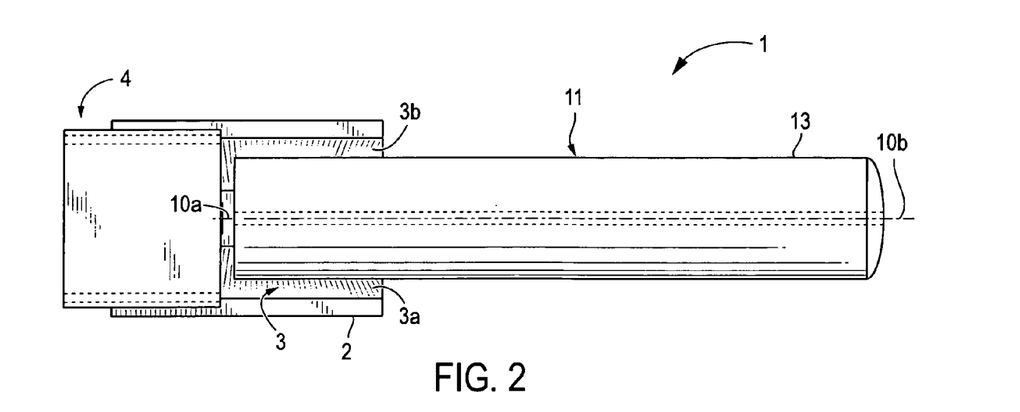
FIG. 2 is a top view of the optical assembly shown in FIG. 1.

Referring to FIGS. 1 and 2, side and top views, respectively, are shown of an optical assembly 1 using the optical true position bench (TPB) approach of the present invention. The optical assembly 1 comprises a platform 2 for holding first and second optical components 4, 11 in optical alignment. Although the optical assembly shown in FIG. 1 and described herein comprises just two optical components, it should be understood that the invention is not limited in the number of optical components which may be held and aligned in the platform 2. For purposes of simplicity and to facilitate understanding, however, this description will focus on an assembly comprising just two optical components.

The platform defines a V-groove 3 with walls 3a, 3b of a certain pitch α. A first optical component 4 is disposed in the V-groove 3. The first optical component 4 has a first optical axis 10a, a reference surface 15 and two sides 6a, 6b, each side is beveled at the certain pitch α outwardly from the reference surface 15. The first optical component 4 being disposed in the V-groove 3 such that the reference surface 15 faces downward with respect to the top surface 14 and the sides 6a, 6b are in parallel contact with the walls 3a, 3b, respectively, of the V-groove 3. A second optical component 11 is also disposed in the V-groove 3. The second optical component has a second optical axis 10b and an outer periphery 13 with at least two contact points 13a, 13b. The second optical component 11 is disposed in the V-groove such that the contact points 13a, 13b contact the walls 3a, 3b of the V-groove 3 and the second optical axis 10b is coaxial with the first axis 10a. Each of these elements is described in greater detail below.

Platform

The platform 2 serves as the main foundation for the optical assembly—it is the backbone of true position bench and serves to support and align the optical components. To this end, it must comprise a rigid material which can be etched or machined to define the V-groove 3. Examples of suitable materials include elemental materials having a crystalline form, polymeric material, glass, ceramics (i.e., oxides, nitrides, carbides, borides and silicides of metals or semi-metals and combinations thereof), quartz, and metals. Preferably, the V-groove is defined in the platform by etching and, more preferably, by wet etching. Wet etching is preferred from a cost effectiveness and accuracy standpoint since extremely precise wet etching techniques are well known and can be performed on a large-scale basis more readily than dry etching. Accordingly, in a preferred embodiment, the platform material is one which has a crystalline form so that wet etching techniques may be used to form grooves having predictable pitch. More preferably, the platform 2 comprises silicon given the material's ability to be etched predictably using wet etching techniques.

As mentioned above, the V-groove formed in the platform 2 has a particular pitch α. The term "pitch," as used herein, refers to the angle between the V-groove wall (e.g., wall 3a) and the surface (e.g., top surface 14) in which the V-groove was etched. The pitch of a V-groove depends upon the etching technique used and the material being etched. For example, due to the crystalline structure of silicon, a predictable and highly precise pitch α of 54.7° can be realized in a V-groove wet etched in silicon.

The dimension of the V-groove in the platform 2 is larger than those typically used in optical subassemblies. Traditionally, V-grooves have been used to receive components having a relatively small circular cross section, such as a fiber, and the optical axis of the component in the V-groove was typically near or above the substrate surface. In the optical assembly of the present invention, however, the V-groove is adapted to receive much larger components relatively speaking, such as a ferrule or optical component comprising one or more optical elements. Additionally, in certain embodiments, the optical axis of the components mounted in the V-groove is below the top surface 14 of the platform 2. To accommodate the relatively large optical components, the V-groove must be relatively large. For example, in the embodiment shown in FIG. 1, the V-groove is wider at the top surface 14 than the second optical component 11 is in diameter. Thus, if the second optical component is an LC-type ferrule, the V-groove at the top surface should be larger than 1250 microns. Due to the relatively large size of the V-groove 3, it may be preferable to truncate the V-groove so as not to have an overly thick platform 2 or a platform which is weakened by an excessively deep V-groove. (Accordingly, the term "V-groove" as used herein means a full V-groove as well as a truncated V-groove.) Such an embodiment is shown in FIG. 1.

First Optical Component

Figure 3:
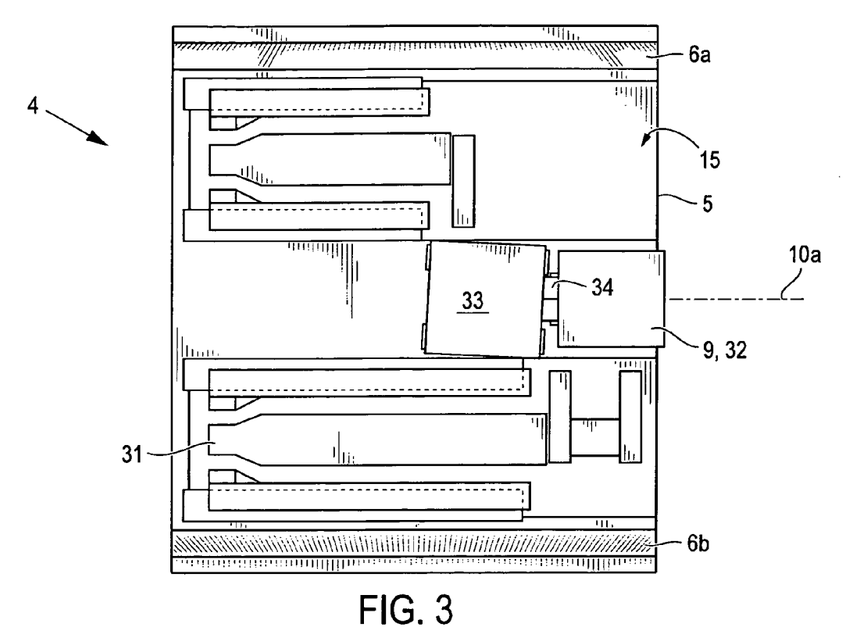
FIG. 3 is a top view of the first optical component mounted up-side-down in the optical assembly of FIG. 1.

The first optical component is a "substrate-type" optical component which refers to optical components which do not have a circular cross section (e.g., fibers and ferrules), but instead have a substantially planar substrate upon which one or more optical elements are attached. Referring to FIGS. 1 and 3, the first optical component 4 is shown. The first optical component 4 comprises a substrate 5 which has sides 6a and 6b which are beveled with respect to the reference surface 15. It is important that the sides are beveled with same pitch as the V-groove so that the sides contact the walls of the V-groove in a parallel arrangement. As mentioned above, the pitch may depend upon the etching technique used and the material being etched. Therefore, it is preferable, although not necessary, that the platform 2 and the substrate 5 comprise a similar material and be etched in a similar fashion. Accordingly, in a preferred embodiment, the substrate 5 is silicon.

The distance between the sides 6a and 6b determines where the first optical component seats in the V-groove 3. For example, for a given V-groove size, a greater distance between the sides 6a and 6b will cause the first optical component to seat higher in the groove. Therefore, by controlling the distance between the sides, which, as discussed below, can be done with great precision using wet etching techniques, the position of the first component in the groove can be controlled.

An optical element 9 is secured to the substrate 5. As used herein, the term "secured to" means mounted on, attached to, embedded in, or incorporated into. The optical element may be for example: (a) a passive component, which does not convert optical energy to another form and which does not change state (e.g., fiber, lens, add/drop filters, arrayed wave guide gratings (AWGs), GRIN lens, splitters/couplers, planar waveguides, or attenuators); (b) an active device which converts between optical energy and electrical energy (e.g., lasers, such as vertical cavity surface emitting laser (VCSEL), double channel, planar buried heterostructure (DC-PBH), buried crescent (BC), distributed feedback (DFB), distributed bragg reflector (DBR); light-emitting diodes (LEDs), such as surface emitting LED (SLED), edge emitting LED (ELED), super luminescent diode (SLD); and photodiodes, such as P Intrinsic N (PIN) and avalanche photodiode (APD)); or (c) a hybrid device which does not convert optical energy to another form but which changes state in response to a control signal (e.g., switches, modulators, attenuators, and tunable filters).

The first optical component has a first optical axis 10a, which is typically near the reference surface 15, although it may be above the surface or below the surface. As shown in FIG. 1, the first optical axis 10a is a first distance from the reference surface 15 and a second distance from each of the two sides 6a, 6b. These are critical dimensions and affect the location of the first optical axis 10a when the first optical component is mounted in the optical assembly 1. In the embodiment shown, there is just one optical axis which is equidistant between sides 6a and 6b. However, it should be understood, that the present invention is not limited to optical components having a single optical axis. In an embodiment having multiple optical axes, a given optical axis may be asymmetrical with respect to sides 6a and 6b.

FIG. 3 shows an example of a first optical component in detail. As shown, the optical element 9 is a laser 32 which is optically coupled to a second optical element, a monitor diode 33. The laser 32 and monitor diode 33 are optically coupled via a light path 34 in the substrate 5. The laser 32 defines the first optical axis 10a. The optical elements are controlled and powered by means of high-speed/low capacitance laser/PIN feed structures 31. The feed structures 31 are adapted to be connected to a circuit board in the final optical assembly. It should be understood that although a laser optical element (and associated elements) is depicted herein, the first optical component may be configured with any combination of active, passive, or hybrid optical elements as mentioned above.

The optical assembly of the present invention facilitates economical and highly repeatable manufacturing of the first optical component. Specifically, the substrate 5 can be prepared by etching a series of parallel V-grooves into the wafer, and then separating the wafer along the V-grooves to create the beveled sides 6a, 6b. In other words, the beveled sides 6a, 6b, as shown in FIGS. 1 and 3, are preferably one half of the V-grooves etched in the silicone wafer. The wafer is simply parted at each V-groove to form an edges 7a, 7b.

Referring to FIGS. 6(a)-(f), a preferred method of preparing the first optical component is shown schematically. In a preferred embodiment, the method of preparing a first optical component for incorporation into the optical assembly comprises: (a) defining (i) the location 61 of at least two parallel V-grooves 67 in a wafer 60 to define at least one center portion 62 between two V-grooves and a side portion 65 on either side of the center portion 62, and (ii) a fiducial location 64 for mounting an optical element 68 on the center portion between the parallel V-grooves 67 wherein the fiducial being a certain distance relative to the parallel V-grooves; (c) etching the V-grooves 67 to define side walls 67a, 67b for each V-groove; (d) creating a fiducial 66 in the fiducial location,64; (e) securing an optical element 68 to the center portion 62 relative to the fiducial 66; and (f) separating the side portions 65 from the center portion 62. It should be obvious that once the center portion is separated from the side portions, it becomes the first optical component 69. (Likewise, the center portion 62 becomes the substrate 5 as shown in FIG. 3.) Finally, as shown in (f), the first optical component 69 is inverted and disposed in the upwardly-facing V-groove 70 of said platform 71 such that the first optical component 69 is supported by the platform 71 solely by the contact of side walls 67a, 67b against the sides 70a, 70b of the V-groove 70.

Figure 6A:
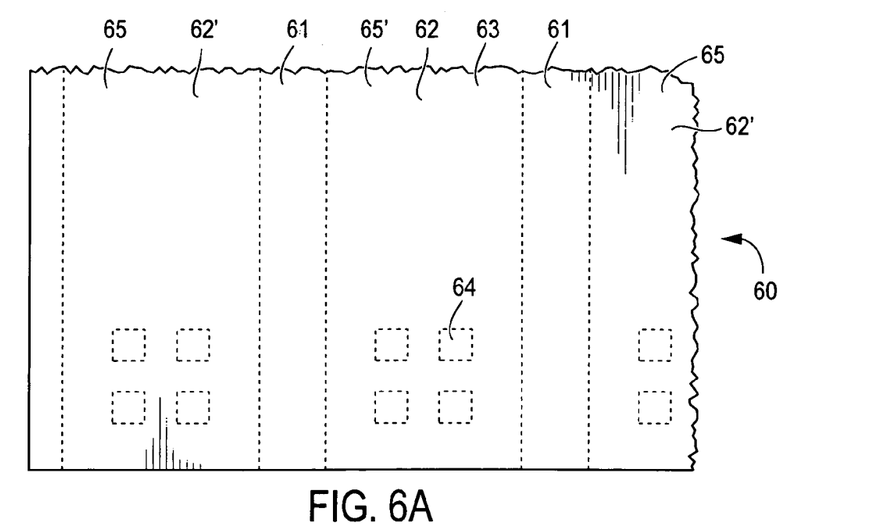
FIGS. 6(a)-(f) depict schematically different' stages in the preparation of the first optical component.
Figure 6B:
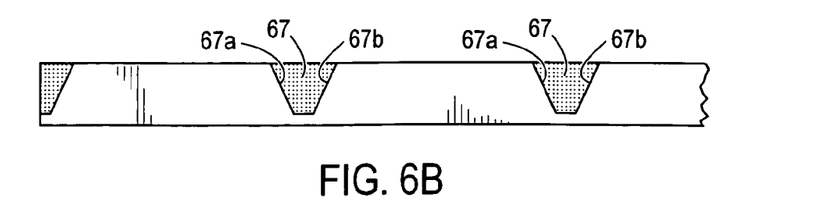
Figure 6C:
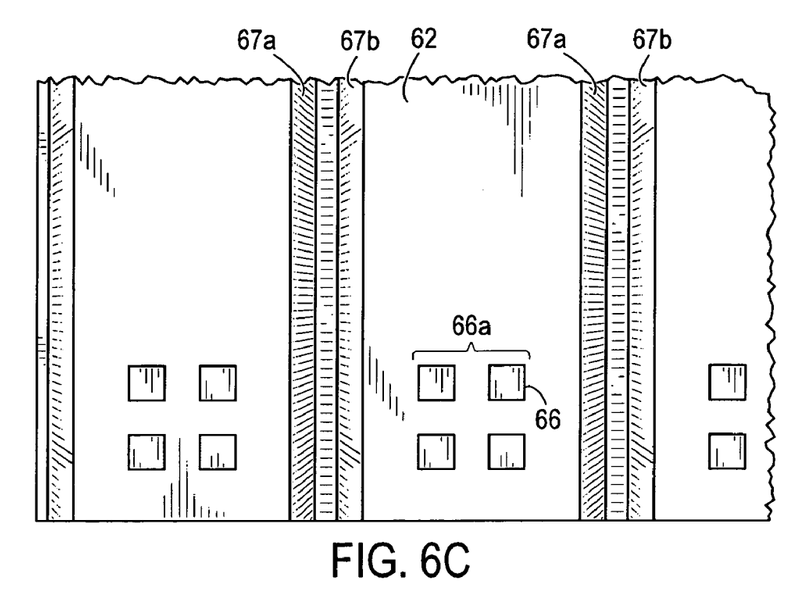

Preferably, steps (a) and (b) are performed in a single photolithography step. The present invention is particularly well suited for the manufacture of such a component since all of the critical dimensions may be defined in a single photolithography step. That is, during the step in which the V-grooves are defined in the silicon wafer (which, as mentioned above, define sides 67a and 67b) fiducials for locating the optical element 68 (and its first optical axis 10a) may be defined on the substrate 5 too. Thus, the critical distance of the optical axis 10a from sides 67a and 67b can effectively be accomplished in a single step, thereby eliminating tolerance build up and simplifying manufacturing.

Figure 4:
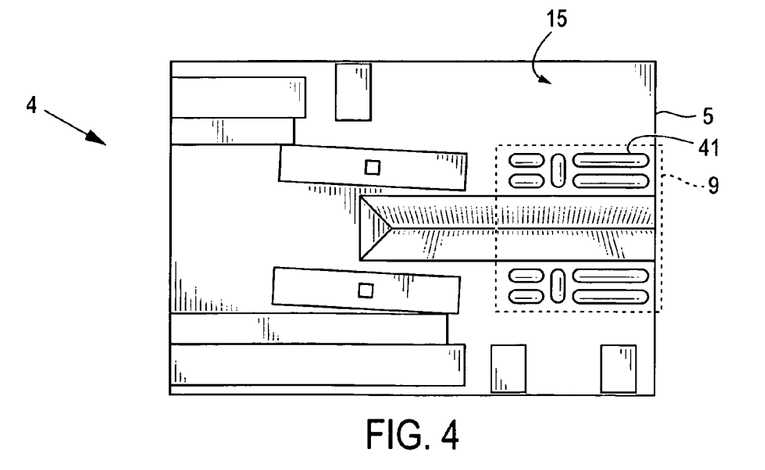
FIG. 4 is a detailed portion of the first optical component of FIG. 3 showing the pattern of solder pads on the substrate used to effect the connection of the optical element to the substrate.
Figure 6D:
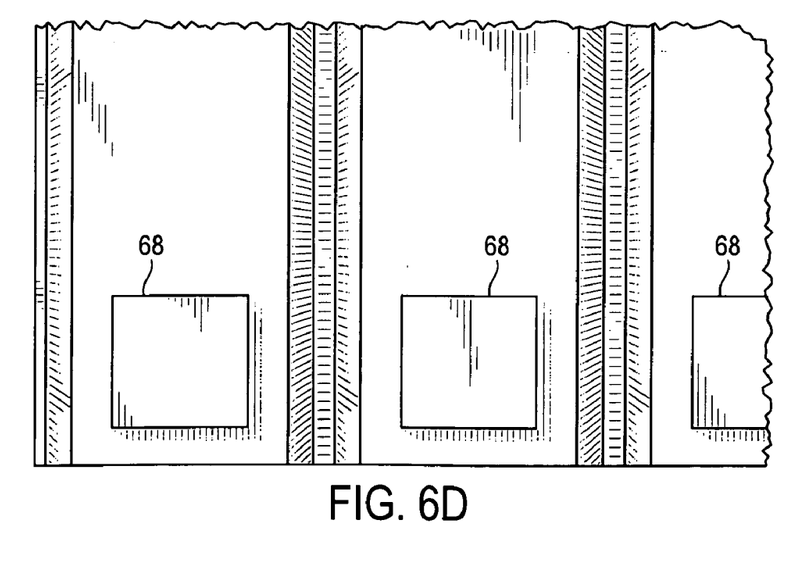
Figure 6E:
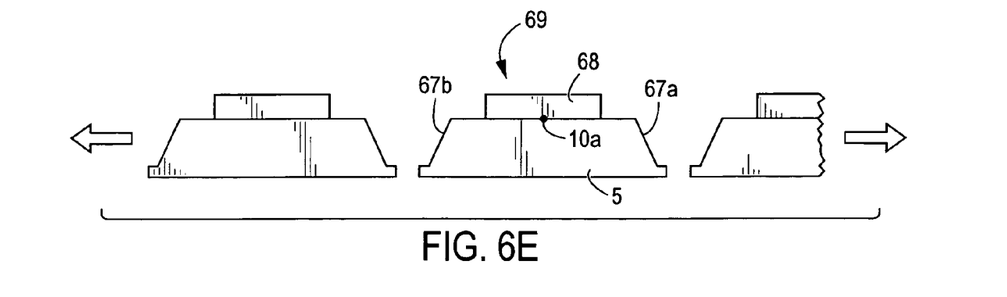
Figure 6F:
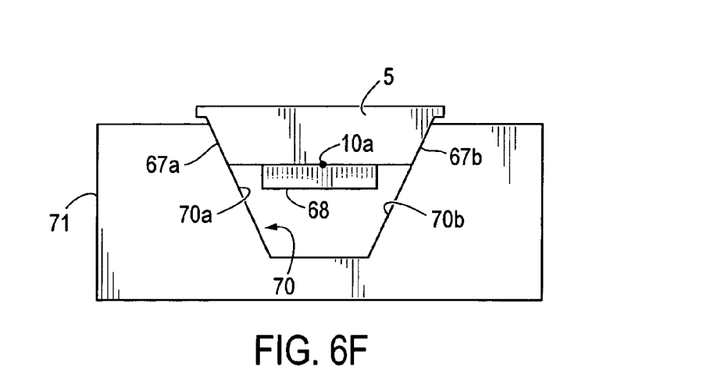

The fiducials may be any structure or marking on the center portion which provides for the passive alignment of the optical element on the center portion. For example, the fiducials may be physical structures having a register surface against which the optical clement may contact to be positioned correctly on the center portion. Alternatively, the fiducials may be markings to enable visual alignment of the optical element on the center portion using a commercially-available, ultra-high precision die bonding machine, such as, for example, a Suss MicroTec machine (See, e.g., U.S. Application No. 20020119588, incorporated herein by reference). In a preferred embodiment though, the fiducials comprise a certain pattern of solder pads 66a (or pads 41 as showy in FIG. 4) on the center portion 62 which match a certain pattern of solder pads on the optical element 68. This way, alignment is achieved in step (e) when the optical element 68 is placed over the first solder pads 66a and the solder of the optical clement and center portion is reflowed such that the surface tension of the solder causes the pattern of the optical element to align over the pattern on the center portion and thereby precisely position the optical element relative to the center portion.

Preferably, the first optical component is produced en mass by exploiting wafer board processing techniques, and, in particular, the V-grooves which define the beveled sides. Specifically, in a preferred embodiment, more than two parallel V-groove locations 61 are defined in step (a) such that the center portion 62 is a side portion 65' relative to at least one of its side portions 65 (and, of course. the side portion 65 may be considered a center Portion 62'. In other words, a single V-groove 67 on the wafer can define a beveled side 67a, 67b for two adjacent portions on the wafer since the V-groove is separated down the middle in step (e).

The method of manufacturing the first optical component described above is broken down into particular steps for purposes illustration. It should be understood, however, that the method of the present invention is not restricted to these discrete steps and that these steps may be performed simultaneously or in any logical order. In a preferred embodiment, step (e) is performed after steps (a), (b), and (c).

Second Optical Component

The second optical component may be a substrate-type component (just like the first optical component described above and thus the description of the first optical component above applies to the second optical component in its entirety), or it may be an optical component traditionally used in combination with the V-groove, particularly those having a circular cross section. Examples of second optical components include fibers, lenses (e.g., ball lenses), and ferrules.

As shown in FIGS. 1 and 2, the second optical component is a ferrule containing a fiber 12 and having an optical axis 10b. The second optical component has a periphery 13 that has two points 13a and 13b that contact with the V-groove when the second optical component is disposed in the V-groove 3. It should be understood, that if the second optical component is a substrate-type optical component, then the points 13a and 13b would be located on its beveled sides as described above with respect to the first optical component.

The second optical component has a second optical axis which is a certain distance from points 13a and 13b. In a single optical axis configuration, this distance is preferably the same, however, if the optical assembly is a multiple optical axis device, then it is likely that each optical axis will not be symmetrically positioned between points 13a and 13b.

Figure 5:
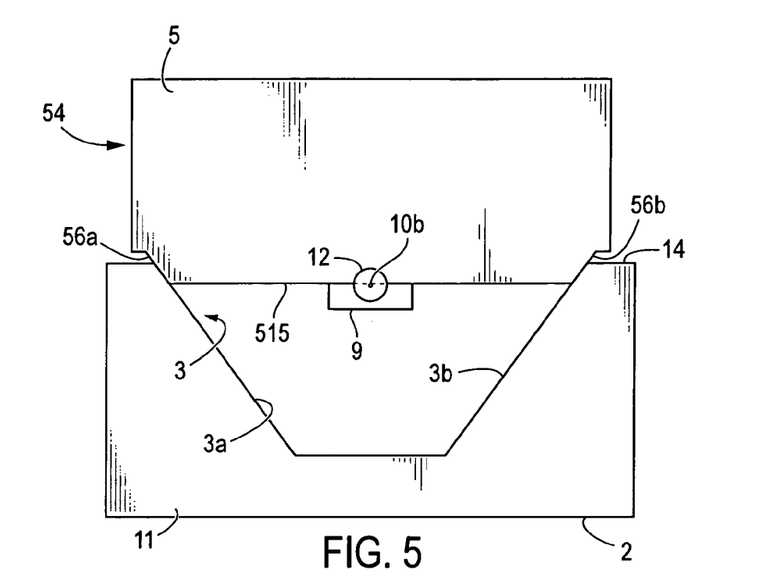
FIG. 5 is side view of another embodiment of the optical assembly using the true position bench of the present invention in which the second optical component is a substrate-type optical Component like the first optical component shown in FIG. 1.

Referring to FIG. 5, the second optical component is depicted as a substrate-type component, which is just like the first optical component described above. In this embodiment, the second optical component 54 has a second optical axis 10b, a reference surface 515 and two sides 56a, 56b, each side is beveled at the certain pitch $\alpha$ outwardly from the reference surface 515. The second optical component 54 being disposed in the V-groove 3 such that the reference surface 515 faces downward with respect to the top surface 14 and the sides 56a, 56b are in parallel contact with the walls 3a, 3b, respectively, of the V-groove 3.

Although only one first optical component and one second optical component are considered herein, it should be understood that a single optical assembly of the present invention may be populated with any number and combination of first and second optical components. For example, it may be preferable to use the TPB approach of the present invention to manufacture a laser subassembly which is based on a continuous wave laser. Specifically, such an optical assembly may comprise a platform of the present invention having a V-groove, an substrate-type optical component mounted in the V-groove and comprising a continuous wave laser optical element (active device), another substrate-type optical component mounted in the V-groove and comprising an optical isolator (passive device), yet another substrate-type optical component mounted in the V-groove and comprising a modulator to modulate the continuous wave to generate signals (hybrid device), and finally a ferrule mounted in the V-groove and containing a fiber to receive the signal (passive device). Still other embodiments will be obvious to those of skill in the art in light of this description.

What is claimed is:

1. A method of preparing a first optical component for incorporation into an optical subassembly, said optical subassembly having a top and bottom orientation and comprising a platform defining an upward-facing V-groove with walls of a certain pitch; said method comprising:
   (a) defining, in a single photolithography step, the location of
      (i) at least two parallel V-grooves in a wafer to define at least one center portion having a reference surface between two V-grooves and a side portion on either side of said center portion; and
      (ii) a fiducial location for mounting a first optical element on said center portion between said parallel V-grooves, said fiducial being a certain distance relative to said parallel V-grooves;
   (b) etching said V-grooves to define side walls of the center portion;
   (c) creating a fiducial at said fiducial location;
   (d) securing an optical element to said center portion relative to said fiducial; and
   (e) separating said side portions from said center portion along said V-grooves to define said first optical component;

(f) inverting said first optical component in said upwardly-facing V-groove of said platform such that said first optical component is supported by said platform solely by the contact of said sides against said walls.

2. The method of claim 1, wherein step (b) is performed by wet etching.

3. The method of claim 1, wherein said step (e) is performed after steps (a), (b), and (c).

4. The method of claim 1, wherein in step (a), defining said at least two parallel V-grooves comprises defining more than two parallel V-grooves are defined such that at least one side portion forms a center portion of a different first optical component.

5. The method of claim 1, wherein said fiducial is a certain pattern of first solder pads on said center portion and step (e) comprises depositing solder material in said pattern.

6. The method of claim 5, wherein said first optical element comprises second solder pads arranged in said certain pattern and step (d) comprises passively placing said optical element over said first solder pads and then reflowing the solder material of said first and second solder pads such that the surface tension of said solder material aligns said first solder pads over said second solder pads and thereby aligns said optical element on said center portion.

7. The method of claim 1, wherein said first optical component comprises a downward-facing edge surface at the top of at least one of said sides, and said platform having a top surface, said first optical component being disposed in said V-groove such that a gap exists between said top surface and said downward-facing edge surface.

\* \* \* \* \*